United States Patent
Hassel et al.

(10) Patent No.: US 12,451,870 B2
(45) Date of Patent: Oct. 21, 2025

(54) SELECTIVE FREQUENCY SHIFTING OF QUBITS

(71) Applicant: IQM Finland Oy, Espoo (FI)

(72) Inventors: Juha Hassel, Espoo (FI); Pasi Lähteenmäki, Espoo (FI)

(73) Assignee: IQM Finland Oy, Espoo (FI)

( * ) Notice: Subject to any disclaimer, the term of this patent is extended or adjusted under 35 U.S.C. 154(b) by 1246 days.

(21) Appl. No.: 17/104,947

(22) Filed: Nov. 25, 2020

(65) Prior Publication Data

US 2021/0350266 A1 Nov. 11, 2021

(30) Foreign Application Priority Data

May 7, 2020 (EP) .................................... 20173395

(51) Int. Cl.
*H03J 3/20* (2006.01)
*G01R 33/035* (2006.01)
*H10N 60/12* (2023.01)

(52) U.S. Cl.
CPC ............ *H03J 3/20* (2013.01); *G01R 33/0354* (2013.01); *H10N 60/12* (2023.02)

(58) Field of Classification Search
CPC .... G06N 10/00; G01R 33/0354; H10N 60/12; H03J 3/20
USPC .......................................................... 706/62
See application file for complete search history.

(56) References Cited

U.S. PATENT DOCUMENTS

| | | | | |
|---|---|---|---|---|
| 8,022,722 B1* | 9/2011 | Pesetski | ............... | H03K 19/195 326/6 |
| 2009/0322374 A1 | 12/2009 | Przybysz et al. | | |
| 2018/0091141 A1* | 3/2018 | Abdo | .................... | G06N 10/00 |
| 2019/0007051 A1* | 1/2019 | Sete | ........................ | G06N 10/00 |

(Continued)

FOREIGN PATENT DOCUMENTS

| | | |
|---|---|---|
| CN | 107580752 A | 1/2018 |
| CN | 110024282 A | 7/2019 |

(Continued)

OTHER PUBLICATIONS

Ramos, R.C. et al, "Capacitively Coupled Josephson Junctions: A Two-Qubit System"; IEE Transactions on Applied Superconductivity, vol. 13, No. 2, Jun. 2003.

(Continued)

*Primary Examiner* — Stephen S Hong
*Assistant Examiner* — Broderick C Anderson
(74) *Attorney, Agent, or Firm* — Meunier Carlin & Curfman LLC (57) ABSTRACT

A quantum computing system, a method, a computer program, and an arrangement for selectively shifting qubit resonance frequencies are disclosed herein. According to an embodiment, an arrangement for selectively shifting qubit resonance frequencies in a quantum computing system comprises a plurality of qubits including at least a first qubit and a second qubit, and a plurality of coupling control resonators including at least a first coupling control resonator and a second coupling control resonator. The arrangement also includes a coupling control signal line. The first coupling control resonator may be configured to shift the resonance frequency of the first qubit when the coupling control signal includes a frequency component in the resonance frequency band of the first coupling control resonator.

17 Claims, 5 Drawing Sheets

(56) References Cited

U.S. PATENT DOCUMENTS

2019/0044668 A1* 2/2019 Elsherbini .............. G06N 10/00
2019/0164077 A1* 5/2019 Roberts ................ H10N 60/805
2019/0303788 A1  10/2019 Kelly et al.
2020/0119254 A1* 4/2020 Jinka ...................... G06N 10/00

FOREIGN PATENT DOCUMENTS

| CN | 111108687 A | 5/2020 |
| CN | 213069884 U | 4/2021 |
| EP | 3266063 | 5/2020 |
| WO | 2016183213 | 11/2016 |

OTHER PUBLICATIONS

Extended Search Report issued in EP20173395.3, dated Nov. 2, 2020, 15 pages.
International Search Report and Written Opinion issued to PCT/FI2021/050334 dated Nov. 17, 2021, 4 pages.
Jerger et al. "Spectroscopy of a Qubit Array via a Single Transmission Line" Physikalisches Institut, Karlsruhe Institute of Technology and DFG-Center for Functional Nanostructures, Institute of Photonic Technology, dated Oct. 24, 2018, 3 pages.
Landig et al., Virtual-photon-mediated spin-qubit-transmon coupling. Nature Communications. 18 pages.
Communication pursuant to Article 94(3) EPC in connection to EP Application No. 20 173 395.3, dated Feb. 25, 2025.
Office Action issued in Chinese App. No. 202010660359.7 mailed Sep. 15, 2024 (with English-language translation), 40 pages.

* cited by examiner

SELECTIVE FREQUENCY SHIFTING OF QUBITS

PRIORITY CLAIM

This application claims priority to European Patent Application No. 20173395.3, filed on May 7, 2020, the entire disclosure of which is incorporated by reference herein.

TECHNICAL FIELD

The present disclosure relates to a quantum electronic device, and more particularly to a quantum computing system and an arrangement for selectively shifting qubit resonance frequencies in a quantum computing system.

BACKGROUND

The ability to selectively shift resonance frequencies of qubits in a quantum computing system is desirable for large scale quantum computing. By shifting the resonance frequency of a qubit, the qubit can be brought into resonance with another qubit in the system. The ability to bring one or more qubits to a resonance frequency may help improve quantum logic gate operations.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective of this disclosure to provide a quantum computing system and an arrangement for selectively shifting qubit resonance frequencies in the quantum computing system. The foregoing and other objectives are achieved by the features of the independent claims. Further implementation forms are apparent from the dependent claims, the description, and the figures.

According to a first aspect, a system or arrangement for selectively shifting qubit resonance frequencies in a quantum computing system comprises a plurality of qubits including at least a first qubit and a second qubit, each of the first qubit and the second qubit having a respective resonance frequency. The system or arrangement also includes a first coupling control resonator and a second coupling control resonator each having a respective resonance frequency band. The system or arrangement further includes a coupling control signal line for feeding a coupling control signal to at least the first coupling control resonator and the second coupling control resonator. The first coupling control resonator is configured to shift the resonance frequency of the first qubit when the coupling control signal includes a frequency component in the resonance frequency band of the first coupling control resonator. The second coupling control resonator is configured to shift the resonance frequency of the second qubit when the coupling control signal includes a frequency component in the resonance frequency band of the second coupling control resonator. The system or arrangement may be configured to, for example, selectively shift the resonance frequency of the first qubit and/or the resonance frequency of the second qubit.

In an implementation form of the first aspect, the plurality of qubits further comprises a third qubit and a fourth qubit, each of the third and the fourth qubits having a respective resonance frequency. The first qubit is capacitively coupled to the third qubit and the second qubit is capacitively coupled to the fourth qubit. The system or arrangement may be configured to, for example, selectively bring the first qubit into resonance with the third qubit and/or selectively bring the second qubit into resonance with the fourth qubit.

In a further implementation form of the first aspect, each qubit in the plurality of qubits comprises at least one Josephson junction. The system or arrangement may be implemented using, for example, superconductive qubits.

In a further implementation form of the first aspect, each qubit in the plurality of qubits comprises a superconducting quantum interference device (SQUID).

In a further implementation form of the first aspect, the resonance frequency band of the coupling control resonator is located in a frequency range that is less than the resonance frequency of the first qubit and the resonance frequency of the second qubit. The system or arrangement may be configured to, for example, shift the resonance frequencies of the qubits such that the coupling control signal does not significantly interfere with the operation of the qubits.

In a further implementation form of the first aspect, the shift of the resonance frequency of the first qubit is proportional to an amplitude of the frequency component in the resonance frequency band of the first coupling control resonator and/or the shift of the resonance frequency of the second qubit is proportional to an amplitude of the frequency component in the resonance frequency band of the second coupling control resonator. Thus, the resonance frequency of the first qubit and/or of the second qubit may be controlled using the amplitude of the corresponding frequency component.

In a further implementation form of the first aspect, the first qubit and the second qubit are capacitively coupled to each other and, after the first qubit and the second qubit are set in resonance, quantum gate operations are performed on the first qubit and the second qubit. Thus, the first qubit and the second qubit may be brought into resonance with each other for quantum computing.

In a further implementation form of the first aspect, the first coupling control resonator is configured to shift the resonance frequency of the first qubit by tuning a Josephson inductance of the first qubit. The system or arrangement may be configured to, for example, efficiently shift the resonance frequency of the first qubit.

In a further implementation form of the first aspect, the first coupling control resonator is configured to shift the resonance frequency of the first qubit by tuning a Josephson inductance of the first qubit by inducing a magnetic flux through the first qubit or by causing a current flow through the first qubit. The system or arrangement may be configured to, for example, tune the Josephson inductance via a magnetic coupling or via electrical coupling between the coupling control resonator and the qubit.

In a further implementation form of the first aspect, the system or arrangement further comprises a plurality of coupling control signal lines including the coupling signal line, and a plurality of coupling control resonators including the first coupling control resonator and the second coupling control resonator. The plurality of qubits is arranged into a matrix. Each qubit in the plurality of qubits may have a respective resonance frequency and each coupling control signal line in the plurality of coupling control signal lines may correspond to a column/row of the matrix. Each coupling control resonator in the plurality of coupling control resonators is configured to shift the resonance frequency of a corresponding qubit in the plurality of qubits when a coupling control signal in a corresponding coupling control signal line includes a frequency component in the resonance frequency band of that coupling control resonator. The arrangement may be configured to, for example, shift the resonance frequency of a selected qubit in the plurality of qubits.

It is to be understood that the implementation forms of the first aspect described above may be used in combination with each other. Several of the implementation forms may be combined together to form a further implementation form.

According to a second aspect, a quantum computing system comprises the system or arrangement according to the first aspect and a control unit that is electrically coupled to the coupling control signal line of the system or arrangement. The control unit is configured to set an amplitude of the frequency component in the resonance frequency band of the first coupling control resonator according to a frequency difference between the resonance frequency of the first qubit and a resonance frequency of another qubit in the plurality of qubits. The control unit is also configured to transmit the coupling control signal to the coupling control signal line. The control unit may be configured to, for example, bring the first qubit into resonance with another qubit.

In an implementation form of the second aspect, the control unit is further configured to set a temporal duration of a pulse comprising the frequency component in the resonance frequency band of the first coupling control resonator according to a pre-configured coupling parameter. The preconfigured coupling parameter indicates an intended coupling strength between the first qubit and another qubit. The control unit may be configured to, for example, control the coupling between the qubits according to the preconfigured coupling parameter.

In a further implementation form of the second aspect, the control unit is further configured to frequency-division multiplex the frequency component in the resonance frequency band of the first coupling control resonator and the frequency component in the resonance frequency band of the second coupling control resonator into the coupling control signal. The control unit may be configured to, for example, shift the resonance frequency of the first qubit and of the second qubit with reduced delay or substantially simultaneously.

It is to be understood that the implementation forms of the second aspect described above may be used in combination with each other. Several of the implementation forms may be combined together to form a further implementation form.

According to a third aspect, a method is provided for selectively shifting qubit resonance frequencies in a quantum computing system comprises the system or arrangement according to the first aspect. The method includes setting an amplitude of the frequency component in the resonance frequency band of the first coupling control resonator according to a frequency difference between the resonance frequency of the first qubit and a resonance frequency of another qubit in the plurality of qubits. The method also includes transmitting the coupling control signal to the coupling control signal line.

According to a fourth aspect, a computer program product is provided. The computer program includes program code configured to perform a method according to the third aspect when the computer program is executed on a computing device.

Many of the attendant features will be more readily appreciated based on the following detailed description provided in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilized, and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
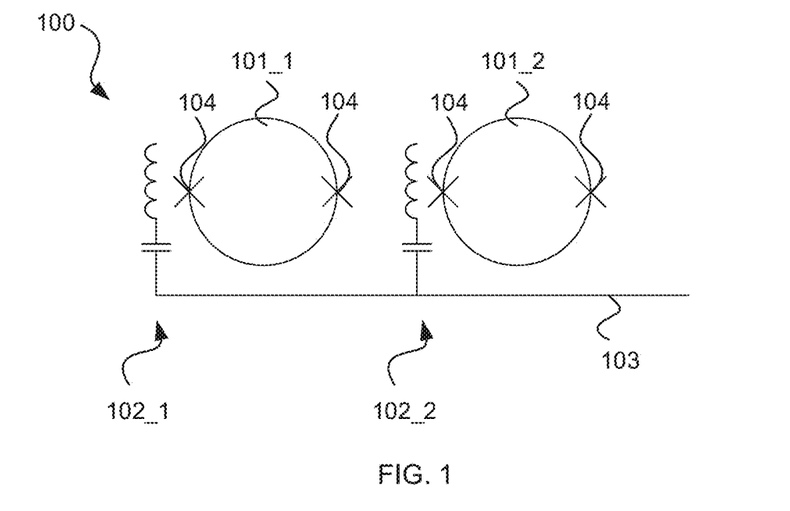
FIG. 1 illustrates a schematic representation of an arrangement for selectively shifting qubit resonance frequencies in a quantum computing system according to an embodiment.

FIG. 1 illustrates a schematic representation of an arrangement 100 for selectively shifting qubit resonance frequencies in a quantum computing system according to an embodiment. According to an embodiment, the arrangement 100 for selectively shifting qubit resonance frequencies in a quantum computing system includes a plurality of qubits comprising at least a first qubit 101_1 and a second qubit 101_2. Each of the first qubit 101_1 and the second qubit 101_2 has a respective resonance frequency.

The resonance frequency of the first qubit 101_1 may not be equal to the resonance frequency of the second qubit 101_2. The resonance frequency of each qubit in the plurality of qubits may be in a range between 1-100 gigahertz (GHz) or in any subrange of this range, such as 4-12 GHz, 4-10 GHz, or 4-8 GHz.

The frequency difference between the resonance frequencies of the first qubit 101_1 and of the second qubit 101_1 may be, for example, greater than 10 megahertz (MHz) and/or less than 1 GHz. For example, the frequency difference may be in a range between 10-300 MHz.

The arrangement 100 may further include a first coupling control resonator 102_1 and a second coupling control resonator 102_2 each having a respective resonance frequency band. The resonance frequency band of the coupling control resonator 102 may refer to a frequency band comprising frequencies that cause the coupling control resonator 102 to resonate. The resonance frequency band may be determined by the physical and/or electrical properties of the coupling control resonator 102. For example, in the embodiment of FIG. 1, the coupling control resonators 102 are implemented using LC resonators each comprising a capacitor and an inductor. Thus, in the idealised case, the resonance frequency $f_0$ of such a resonator is $$f_0 = \frac{1}{2\pi\sqrt{LC}},$$

where L is the inductance of the inductor and C is the capacitance of the capacitor. However, due to imperfections, such as losses, an LC resonator may not resonate only at a single resonance frequency but in a resonance frequency band. Thus, a coupling control resonator 102 may function as a bandpass filter.

The width of the resonance frequency band of a coupling control resonator 102 may be defined using, for example, full width at half maximum (FWHM) bandwidth of the coupling control resonator 102. The resonance frequency band of a coupling control resonator may be, for example, in a range between 1-10 GHz, or in any subrange of this range, such as between 1-8 GHz, 2 7 GHz, or 1-5 GHz. The coupling control resonator 102 may also be referred to as a bandpass filter, a coupling bandpass filter, or similar.

Although some examples of coupling control resonators 102, such as LC resonators, are disclosed in the embodiments herein, a coupling control resonator 102 may also be implemented in various other ways and using various other components. In any embodiment disclosed herein, a coupling control resonator 102 may be implemented using, for example, any type of bandpass filter. For example, a coupling control resonator 102 may be implemented using a more complex geometry corresponding to a higher order bandpass filter. Such a higher order bandpass filter may approximate a rectangular frequency response of an ideal bandpass filter.

According to an embodiment, the resonance frequency band of the first coupling control resonator 102_1 and the resonance frequency band of the second coupling control resonator 102_2 do not overlap, or overlap only partially.

The arrangement 100 may further include a coupling control signal line 103 for feeding a coupling control signal to at least the first coupling control resonator 102_1 and/or the second coupling control resonator 102_2. The coupling control signal line 103 may also be referred to as a gate bus or similar. The coupling control signal line 103 may be implemented, for example, as a trace on a printed circuit board (PCB), as a cable, as a transmission line, as a waveguide, or similar. The first coupling control resonator 102_1 and/or the second coupling control resonator 102_2 may be electrically coupled to the coupling control signal line 103.

The first coupling control resonator 102_1 is configured to shift the resonance frequency of the first qubit 101_1 when the coupling control signal comprises a frequency component in the resonance frequency band of the first coupling control resonator 102_1. The second coupling control resonator 102_2 is configured to shift the resonance frequency of the second qubit 101_2 when the coupling control signal comprises a frequency component in the resonance frequency band of the second coupling control resonator 102_2.

The first coupling control resonator 102_1 may be configured to shift the resonance frequency of the first qubit 101_1 in response to the coupling control signal including a frequency component in the resonance frequency band of the first coupling control resonator 102_1. The second coupling control resonator 102_2 may be configured to shift the resonance frequency of the second qubit 101_2 in response to the coupling control signal comprising a frequency component in the resonance frequency band of the second coupling control resonator 102_2. The coupling control signal may include, for example, an alternating current (AC) signal, such as a radio frequency (RF) signal or a microwave signal.

A coupling control resonator 102 may shift the resonance frequency of a corresponding qubit 101 by tuning a Josephson inductance of the qubit 101. A coupling control resonator 102 may, for example, utilize the nonlinearity of the qubit 101 and AC magnetic flux pulses to tune the Josephson inductance of the qubit 101. For example, in the embodiment of FIG. 1, the magnetic flux generated by each coupling control resonator 102 may couple with the corresponding qubit 101. The magnetic flux can then shift the resonance frequency of the qubit 101 when the coupling control signal comprises a frequency component in the resonance frequency band of the coupling control resonator.

The frequency component in the resonance frequency band of a coupling control resonator 102_1, 102_2 results in an AC magnetic flux through the corresponding qubit 101_1, 101_2. The AC magnetic flux, on average, results in a lower effective critical current for the qubit 101_1, 101_2, thereby increasing the effective Josephson inductance ($L_J \sim 1/I_c$, where $I_c$ is a critical current that is proportional to the flux according to the Josephson effect) and lowering the effective resonance frequency of the qubit 101_1, 101_2.

The shifting of qubit frequencies may bring two qubits 101 initially at different frequencies to resonance via, for example, capacitively coupling between the qubits. When the two qubits 101 are in resonance, quantum logic gate operations may be performed on the qubits. The qubits in resonance may become entangled. Entanglement between qubits 101 may be required in order to implement various quantum logic gate operations using the qubits 101.

Since each coupling control resonator 102 can have a different resonance frequency band, one can frequency-division multiplex multiple frequency components into a coupling control signal. The coupling control resonators 102 may demultiplex the frequency components from the coupling control signal. Thus, each frequency component can be used to shift the resonance frequency of a single qubit. This way, multiple qubits can be addressed substantially simultaneously using a single coupling control signal line 103. This can simplify chip designs and eliminate direct current (DC) as a source of drift.

A frequency component in the resonance frequency band of a coupling control resonator 102 may result in shifting of the qubit resonance frequency of a corresponding qubit 101. The frequency shift may be proportional to an amplitude of the frequency component. The qubit 101 may remain insensitive to the frequency components outside the resonance frequency band of the corresponding coupling control resonator 102.

Parameters of the qubits may be determined during calibration. Amplitude of the frequency component in the resonance frequency band of the coupling control resonator can be configured according to the parameters, since the shift in the resonance frequency of the corresponding qubit is proportional to the amplitude. The value of the coupling capacitance can also be determined during the calibration stage. The coupling capacitance relates to a rate at which the qubits exchange energy when at resonance, thus providing for the determination of a duration of the coupling control pulse in order for the qubits to exchange the desired amount of energy.

A coupling control resonator 102 may lower or raise the resonance frequency of a corresponding qubit 101. Depending on the implementation of the coupling control resonator 102 and/or the implementation of the qubit 101, only raising or lowering of the resonance frequency of the qubit 101 may be possible/practical. In some embodiments, two qubits 101 may be brought into resonance by lowering the resonance frequency of one qubit and raising the resonance frequency of another qubit.

According to an embodiment, a shift of the resonance frequency of the first qubit 101_1 is proportional to an amplitude of a frequency component in a resonance frequency band of the first coupling control resonator 102_1. Additionally or alternatively, a shift of the resonance frequency of the second qubit 101_2 is proportional to an amplitude of a frequency component in a resonance frequency band of the second coupling control resonator 102_2. The frequency shifting may make it possible to, for example, bring the first/second qubit 101 into resonance with another qubit in the arrangement 100. The first/second qubit 101 and the other qubit may be capacitively coupled. The other qubit may include, for example, a nearest neighbour qubit of the first/second qubit 101. In some embodiments, the frequency components of the coupling control signal are so far below the qubit resonance frequencies that the coupling control signal does not interfere with the operation of the qubits 101.

According to an embodiment, the resonance frequency band of the coupling control resonator 102 is located in a frequency range that is less than the resonance frequency of the first qubit 101_1 and the resonance frequency of the second qubit 101_2. This may reduce interference between the coupling control signal and the qubits 101 (located in the plurality of qubits), as described above.

According to an embodiment, each qubit 101 in the plurality of qubits includes at least one Josephson junction 104. For example, in the embodiment of FIG. 1, each qubit 101 comprises two Josephson junctions 104. In other embodiments, each qubit 101 in the plurality of qubits may comprise any number of Josephson junctions 104 depending on the type of qubit.

According to an embodiment, each qubit 101 in the plurality of qubits includes a superconductive qubit. According to an embodiment, each qubit 101 in the plurality of qubits comprises a superconducting quantum interference device (SQUID). A SQUID may include two Josephson junctions connected in a loop. Such a loop may also be referred to as a SQUID loop.

Although some embodiments may be disclosed herein with reference to a certain type of qubit, these qubit types are only exemplarily. In any embodiment disclosed herein, the qubits may be implemented in various ways and using various technologies. The plurality of qubits disclosed herein may include, for example, flux qubits, phase qubits, and/or transmons. Different types of qubits can be made to possess the Josephson inductance tuning functionality with some circuit modifications.

In some embodiments, the shifting of the qubit resonance frequency may be achieved using an alternating current (AC), such as RF or microwave signal, through a SQUID or a Josephson junction. A similar functionality follows from the fact that in a SQUID or in a Josephson junction, the Josephson inductance can also be controlled by current in a qualitatively similar manner as by magnetic flux.

According to an embodiment, the first coupling control resonator 102_1 is configured to shift the resonance frequency of the first qubit 101_1 by tuning a Josephson inductance of the first qubit 101_1. Additionally or alternatively, the second coupling control resonator 102_2 may be configured to shift the resonance frequency of the second qubit 101_2 by tuning a Josephson inductance of the second qubit 101_2.

According to an embodiment, the first coupling control resonator 102_1 is configured to shift the resonance frequency of the first qubit 101_1 by tuning a Josephson inductance of the first qubit 101_1 by inducing a magnetic flux through the first qubit 101_1 or by causing a current flow through the first qubit 101_1. Additionally or alternatively, the second coupling control resonator 102_2 may be configured to shift the resonance frequency of the second qubit 101_2 by tuning a Josephson inductance of the second qubit 101_2 by inducing a magnetic flux through the second qubit 101_2 or by causing a current flow through the second qubit 101_2.

Figure 2:
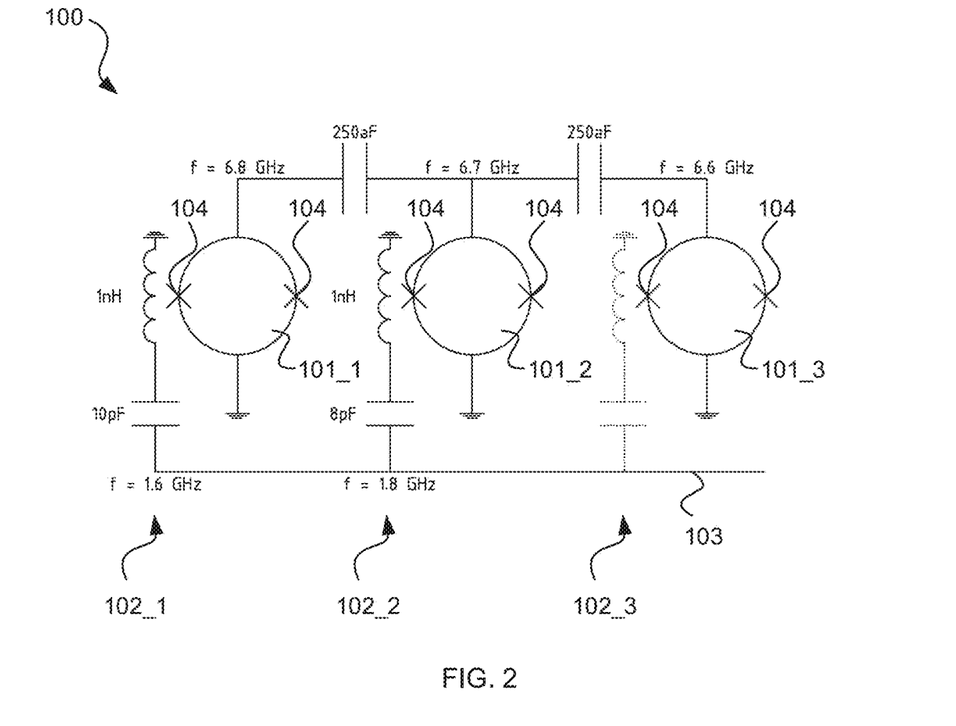
FIG. 2 illustrates a schematic representation of an arrangement for selectively shifting qubit resonance frequencies in a quantum computing system according to another embodiment.

FIG. 2 illustrates a schematic representation of an arrangement 100 for selectively shifting qubit resonance frequencies in a quantum computing system according to a further embodiment. In the embodiment of FIG. 2, the plurality of qubits 101 further includes a third qubit 101_3 in addition to the first qubit 101_1 and the second qubit 101_2.

According to an embodiment, the first qubit 101_1 and the second qubit 101_2 are capacitively coupled to each other. For example, in the embodiment of FIG. 2, the first qubit 101_1 and the second qubit 101_2 are capacitively coupled to each other via a capacitor. The first qubit 101_1 and/or the second qubit 101_2 may be capacitively coupled to any other qubits in the plurality of qubits. In the embodiment of FIG. 2, for example, the second qubit 101_2 is capacitively coupled to the first qubits 101_1 and to the third qubit 101_3.

In the embodiment of FIG. 2, the resonance frequencies of the first qubit 101_1, the second qubit 101_2, and the third qubit 101_3 are 6.8 GHz, 6.7 GHz, and 6.6 GHz, respectively. Further, the resonance frequency band of the first coupling control resonator 102_1 includes a frequency of 1.6 GHz and the resonance frequency band of the second coupling control resonator 102_2 includes a frequency of 1.8 GHz. Thus, a coupling control signal comprising a frequency component at 1.6 GHz may shift the resonance frequency of the first qubit 102_1, since the 1.6 GHz component is demultiplexed by the first resonator 102_1, which in turn tunes the Josephson inductance of the first qubit 101_1. Similarly, a coupling control signal comprising a frequency component at 1.8 GHz may shift the resonance frequency of the second qubit 102_2. The arrangement 100 may further comprise a third coupling control resonator 102_3 for shifting the resonance frequency of the third qubit 101_3.

Figure 3:
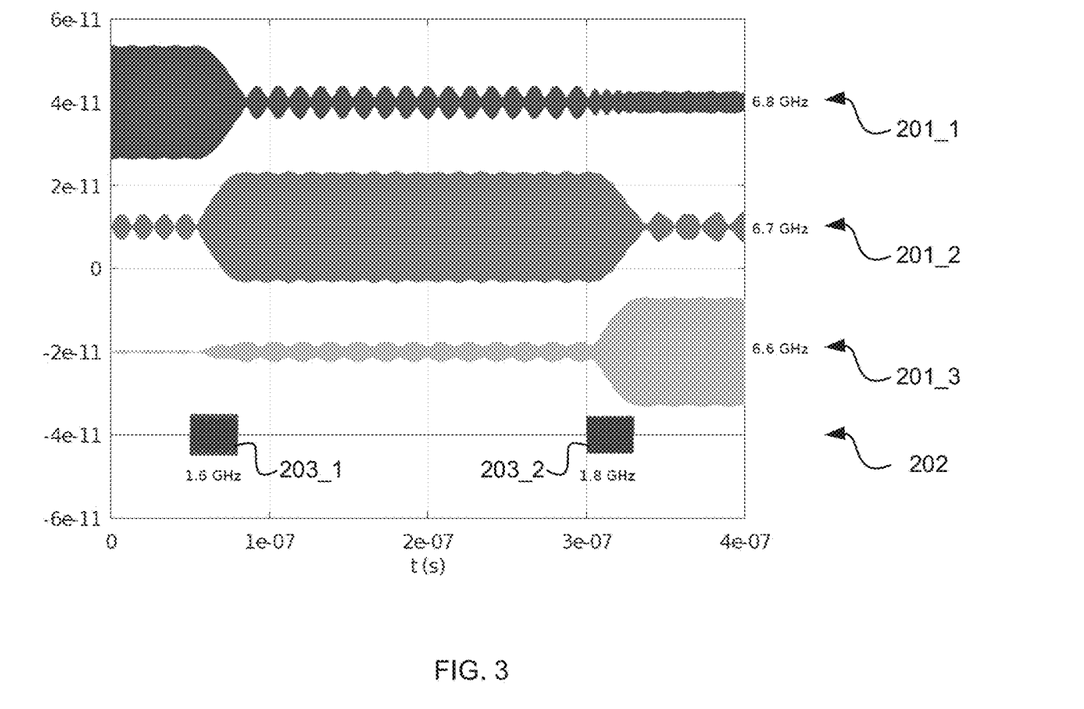
FIG. 3 illustrates a schematic representation of simulation results according to an embodiment.

FIG. 3 illustrates a plot representation of simulation results for the arrangement 100 illustrated in the embodiment of FIG. 2. The embodiment of FIG. 3 illustrates simulated envelopes 201_1, 201_2, and 201_3 of voltages across each qubit 101_1, 101_2, and 101_3, respectively. The embodiment of FIG. 3 further illustrates a coupling control signal 202 comprising two pulses 203_1 and 203_2.

The embodiment of FIG. 3 illustrates only a principle of operation. The parameters used for the simulation have not been optimized. Moreover, no DC is present in any of the waveforms. Rather, the waveforms have been shifted for clarity of visualization. The coupling control signal 202 has been scaled down to fit the figure.

At the start of the simulation, the first qubit 101_1 is in an exited state and both the second qubit 101_2 and the third qubit 101_3 are initially in ground states. This can be observed in the voltages over the qubits, 201_1, 201_2, and 201_3.

The first qubit 101_1 is brought to resonance with the second qubit 101_2 by a 30 nanosecond (ns) AC signal pulse 203_1 at frequency of 1.6 GHz at a time instant t=65 ns. Since the resonance frequency band of the first coupling control resonator 102_1 comprises the frequency of 1.6 GHz, which corresponds to the pulse 203_1, the first coupling control resonator 102_1 shifts the resonance frequency of the first qubit 101_1 down to substantially match the resonance frequency of the second qubit 101_2.

Thus, the coupling control signal 202 from the coupling control signal line 103 is demultiplexed and routed to the first qubit 101_1, i.e. the target qubit, via the first coupling control resonator 102_1. The first qubit 101_1 and the second qubit 101_2 exchange energy through a capacitive coupling while in resonance. Thus, energy is transferred from the first qubit 101_1 to the second qubit 101_2, which can be observed from the voltages over the qubits, 201_1, 201_2.

At time instant t=315 ns, a second coupling control signal pulse 203_2 at a frequency of 1.8 GHz brings the second qubit 101_2 into resonance with the third qubit 101_3. Thus, energy is transferred from the second qubit 101_2 to the third qubit 101_3 in a similar manner as described above for the first 101_1 and second qubit 101_2.

As can be observed from the semiclassical analysis of FIG. 3, a coupling control resonator 102 can tune the Josephson inductance of a corresponding qubit 101 by an external drive at a frequency different from the qubit 101 resonance frequency. This has the effect of shifting the resonance frequency of the qubit 101. The coupling control resonators 102 can demultiplex the different frequency components from the coupling control signal 202 so that the resonance frequency of an appropriate qubit 101 is shifted. A different circuit scheme may also carry out the same functionality.

In the embodiment of FIG. 3, the frequency components in the coupling control signal 202 are at lower frequencies compared to the resonance frequencies of the qubits 101. In other embodiments, the frequencies of the frequency components may be higher than the resonance frequencies of the qubits 101. In such cases, the coupling control signal can cause time-varying frequency control, i.e. the resonance frequency of the corresponding qubit may vary in time. After time averaging, this can lead to, for example, transfer of energy between the two qubits.

There may be some qualitative differences, however, in how the inductances of the qubits 101 are tuned using high frequency coupling control signals compared to low frequency coupling control signals. For a high frequency coupling control signal, the Josephson inductance during the tuning may be essentially constant during the coupling control signal pulse whereas, for a lower frequency coupling control signal, the Josephson inductance (and thus the coupling) varies in time.

Figure 4:
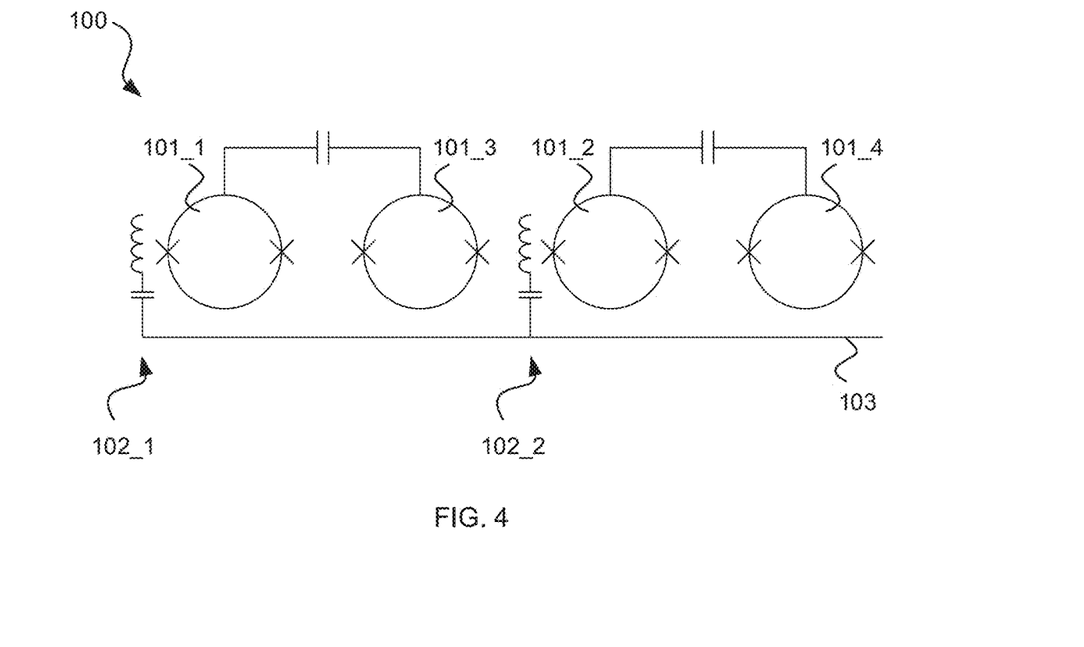
FIG. 4 illustrates a schematic representation of an arrangement for selectively shifting qubit resonance frequencies in a quantum computing system according to a further embodiment.

FIG. 4 illustrates a schematic representation of an arrangement 100 for selectively shifting qubit resonance frequencies in a quantum computing system according to a further embodiment. According to an embodiment, the plurality of qubits further comprises a third qubit 101_3 and a fourth qubit 101_4. Each of the third and the fourth qubits have a respective resonance frequency.

The first qubit 101_1 may be capacitively coupled to the third qubit 101_3 and the second qubit 101_2 may be capacitively coupled to the fourth qubit 101_4. Using the coupling control signal in the coupling control signal line 103, the first qubit 101_1 may be brought into resonance with the third qubit 101_3 by shifting the resonance frequency of the first qubit 101_1 as disclosed herein. Similarly, using the coupling control signal in the coupling control signal line 103, the second qubit 101_2 may be brought into resonance with the fourth qubit 101_4 by shifting the resonance frequency of the second qubit 101_2 as disclosed herein.

The third qubit 101_3 and/or the fourth qubit 101_4 may also be coupled to the coupling control signal line 103 via respective coupling control resonators. Alternatively, the third qubit 101_3 and/or the fourth qubit 101_4 be coupled to a second coupling control signal line via respective coupling control resonators. The arrangement 100 may comprise any number of coupling control signal lines.

Figure 5:
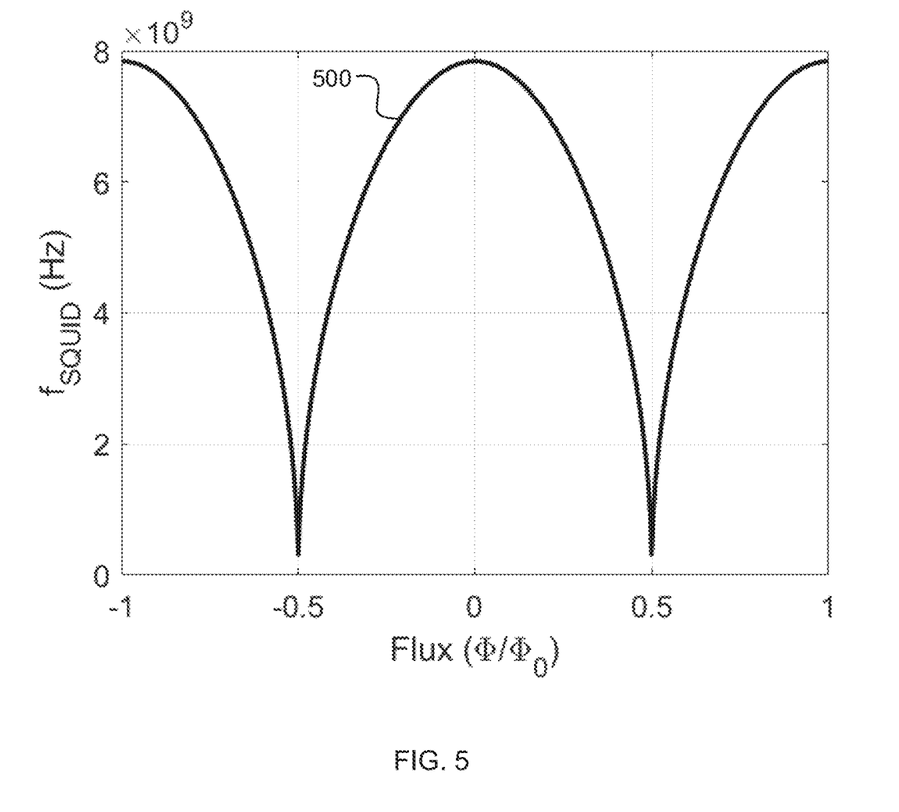
FIG. 5 illustrates a plot representation of qubit resonance frequency as a function of magnetic flux according to an embodiment.

FIG. 5 illustrates a plot representation of qubit resonance frequency as a function of magnetic flux, according to an embodiment. In the embodiment of FIG. 5, the resonance frequency $f_{SQUID}$ (shown as line 500) of a SQUID qubit shifts due to the magnetic flux $\Phi$ applied through the SQUID. Thus, the resonance frequency of the SQUID qubit can be tuned by changing the magnetic flux $\Phi$. Other types of qubits may demonstrate similar behaviour at least when circuit modifications are applied to the qubit. Similar tuning of the resonance frequency may also be achieved via an electrical current instead of a magnetic flux, as disclosed herein.

Figure 6:
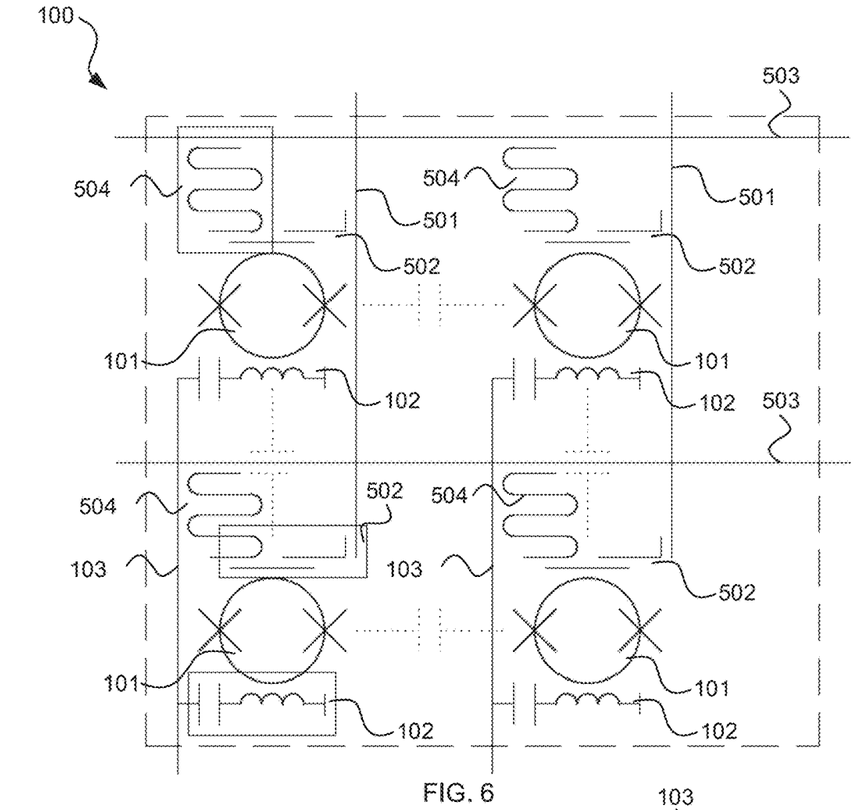
FIG. 6 illustrates a schematic representation of an arrangement for selectively shifting qubit resonance frequencies in a quantum computing system according to a further embodiment.

FIG. 6 illustrates a schematic representation of an arrangement 100 for selectively shifting qubit resonance frequencies in a quantum computing system according to a further embodiment. The arrangement 100 may include a plurality of coupling control signal lines 103. For example, in the embodiment of FIG. 6, two coupling control signal lines 103 are illustrated.

The arrangement 100 may further include a plurality of coupling control resonators 102, including the first coupling control resonator and the second coupling control resonator discussed above in connection with FIGS. 1, 2, and 4. For example, in the embodiment of FIG. 6, four coupling control resonators 102 are illustrated.

The plurality of qubits 101 may be arranged into a matrix. Each qubit 101 in the plurality of qubits may have a respective resonance frequency. Each coupling control signal line 103 in the plurality of coupling control signal lines may correspond to a column/row of the matrix. For example, in the embodiment of FIG. 6, four qubits 101 arranged into a matrix are illustrated. The illustrated qubits 101 may be part of a large matrix of qubits.

Each coupling control resonator 102 in the plurality of coupling control resonators may be configured to shift the resonance frequency of a corresponding qubit 101 in the plurality of qubits when a coupling control signal in a corresponding coupling control signal line 103 comprises a frequency component in the resonance frequency band of that coupling control resonator 102. For example, in the embodiment of FIG. 6, each qubit 101 in the plurality of qubits has a corresponding coupling control resonator 101.

A corresponding coupling control signal line 103 may refer to a coupling control signal line 103 in the same column/row of the matrix as the coupling control resonator 102 in question. For example, in the embodiment of FIG. 6, a corresponding control signal line 103 may refer to a coupling control signal line 103 in the same column of the matrix as the coupling control resonator 102 in question, since each coupling control signal line 103 corresponds to a column of the matrix.

Each qubit 101 in the plurality of qubits may be capacitively coupled to each nearest neighbour qubit. For example, in the embodiment of FIG. 6, each qubit is capacitively coupled to two other qubits. In a larger matrix of qubits, each qubit 101 may be capacitively coupled to at least three or four nearest neighbour qubits.

The arrangement may further comprise a plurality of rotation signal lines 501. Each rotation signal line 501 may correspond to a row/column of the matrix. For example, in the embodiment of FIG. 6, each rotation signal line 501 corresponds to a column of the matrix.

The arrangement 100 may further comprise a plurality of rotation resonators 502. Each rotation resonator 502 may be coupled to a corresponding qubit 101. Each rotation resonator 502 may be coupled to a corresponding rotation signal line 503. Thus, the quantum state of the qubits 101 may be rotated using the rotation signal lines 501.

The arrangement 100 of FIG. 6 may further include a plurality of readout signal lines 503. Each readout signal lines 503 may correspond to a row/column of the matrix. For example, in the embodiment of FIG. 6, each readout signal line 503 corresponds to a row of the matrix.

The arrangement 100 may further comprise a plurality of readout resonators 504. Each readout resonator 504 may be coupled to a corresponding qubit 101. Each readout resonator 504 may be coupled to a corresponding readout signal line 503. Thus, the state of the qubits 101 may be measured using the readout signal lines 503.

Using the arrangement 100, qubit rotations, gates, and/or measuring the state of qubits 101 may be performed. This may be done without significantly increasing the number of connections needed in the arrangement 100.

Each coupling control resonator 103, rotation resonator 502, and/or readout resonator 504 may function as a per qubit bandpass filter. Thus, frequency shifting, rotations, and readout can be performed independently on each qubit 101 without introducing unwanted effects due to the same signal unintentionally operating on several different qubits 101 at once.

Figure 7:
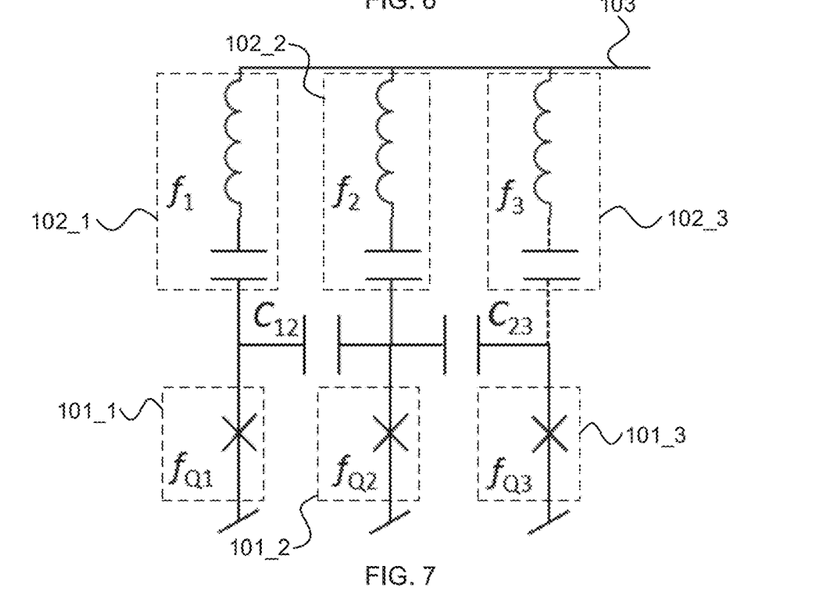
FIG. 7 illustrates a schematic representation of an arrangement for selectively shifting qubit resonance frequencies in a quantum computing system according to a further embodiment.

FIG. 7 illustrates a schematic representation of an arrangement 100 for selectively shifting qubit resonance frequencies in a quantum computing system according to a further embodiment. According to an embodiment, the first coupling control resonator 102_1 is configured to shift the resonance frequency of the first qubit 101_1 by tuning a Josephson inductance of the first qubit 101_1 by causing a current flow through the first qubit.

The embodiment of FIG. 7 illustrates an example of tuning Josephson inductance of a qubit 101 using a current flow through the qubit 101. Similarly to the embodiments disclosed above, each qubit 101 is coupled to a corresponding coupling control resonator 102. Each coupling control resonator 102 may be coupled to the coupling control signal line 103. In the embodiment of FIG. 7, when the coupling control signal comprises a frequency component in the resonance frequency band of the first coupling control resonator 102_1, a current flows through the first coupling control resonator 102_1 to the first qubit 101_1. Thus, the Josephson inductance of the first qubit 101_1 is tuned by the current, and the resonance frequency of the first qubit 101_1 is shifted.

Similarly to the tuning via magnetic flux, when tuning the Josephson inductance via a current flow, the frequency component in the resonance frequency band of the coupling control resonator may be at a lower or at a higher frequency than the resonance frequency of the corresponding qubit. Like with magnetic flux tuning, coupling control signals with a lower frequency than the resonance frequency of the qubit provide a parametric tuning mechanism for a substantially instantaneous controlling the Josephson inductance.

For coupling control signals with a higher frequency than the resonance frequency of the qubit, there are analytic approximations for the effective Josephson junction critical current $1_{c,eff}$ as a function of the coupling control signal amplitude and frequency. This can be expressed as $$I_{c,eff} = I_c \left| J_1\left(\frac{I_1}{2\pi\Phi_0 f^2 C}\right) \right|,$$

where $1_c$ is the critical current of the Josephson junction without the coupling control signal, $1_1$ is the current amplitude of the coupling control signal, $\Phi_0$ is the flux quantum, f is the coupling control signal frequency, C is the capacitance of the Josephson junction, and $J_1$ is the Bessel function of the first kind and of order one. This leads to the Josephson inductance $L_{eff}$ as tuneable by an AC coupling control signal (amplitude $1_1$, frequency f) as $$L_{eff} = \frac{\Phi_0}{2\pi I_{c,eff}}.$$

The resonance frequency then shifts according to the resonance condition $$f_0 = \frac{1}{2\pi\sqrt{L_{eff}C}}.$$

Using the resonance frequency shift, the first qubit 101_1 may be brought into resonance with the second qubit 101_2.

In a similar fashion, the resonance frequency of the second qubit 101_2 and/or of the third qubit 101_3 may be shifted. The second qubit 101_2 may be brought into resonance with the first qubit 101_1 and/or with the third qubit 101_3. Alternatively or additionally, the third qubit 101_3 may be brought into resonance with the second qubit 101_2.

Each qubit 101 may further comprise a shunt capacitor. The shunt capacitor may be arranged in parallel with the Josephson junction of each qubit. The shunt capacitors are not illustrated in the embodiment of FIG. 7 for brevity.

When the Josephson inductance of a qubit 101 is tuned using an electrical current, the qubit 101 may comprise a single Josephson junction. This may provide an advantage by making the arrangement 100 more insensitive to magnetic noise and interference. However, a need for a galvanic contact for current driving may create some challenges in the circuit design.

Figure 8:
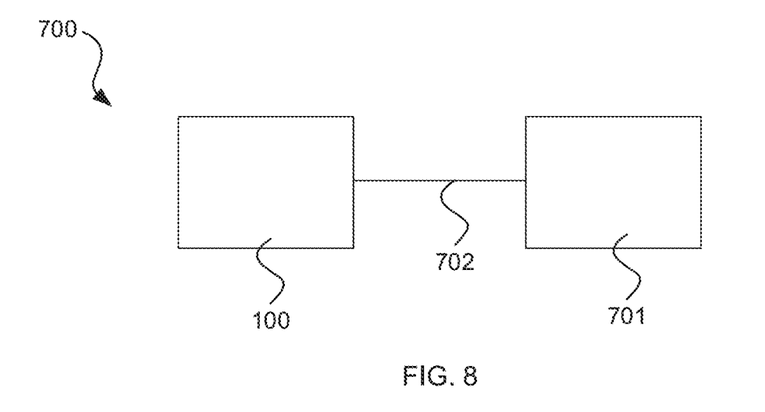
FIG. 8 illustrates a schematic representation of a quantum computing system according to an embodiment.

FIG. 8 illustrates a schematic representation of a quantum computing system 700 according to an embodiment. According to an embodiment, the quantum computing system 700 includes the arrangement 100 and a control unit 701 that is electrically coupled 702 to the coupling control signal line 103 of the arrangement 100.

When the system 700 is operational, the arrangement 100 may be physically located in a cryostat or similar. The cryostat may cool the plurality of qubits in the arrangement 100 to cryogenic temperatures. This may be required if the qubits in the plurality of qubits are, for example, superconductive qubits. The control unit 701 may be located outside the cryostat.

The control unit 701 may be configured to set an amplitude of the frequency component in the resonance frequency band of the first coupling control resonator 102_1 according to a frequency difference between the resonance frequency of the first qubit 101_1 and a resonance frequency of another qubit in the plurality of qubits. The control unit 701 also transmits the coupling control signal to the coupling control signal line 103.

Alternatively or additionally, the control unit 701 may be configured to set an amplitude of the frequency component in the resonance frequency band of the second coupling control resonator 102_2 according to a frequency difference between the resonance frequency of the second qubit 101_2 and a resonance frequency of another qubit in the plurality of qubits. The control unit 701 also transmits the coupling control signal to the coupling control signal line 103.

An amplitude of the coupling control signal may refer to, for example, the current amplitude, voltage amplitude, or electric field amplitude of the coupling control signal. The other qubit mentioned above may comprise, for example, the second qubit 101_2, the third qubit 101_3, or any other qubit in the plurality of qubits. The other qubit may be capacitively coupled to the first/second qubit.

The frequency shift of the first/second qubit 101_1, 101_2 may be proportional to the amplitude of the frequency component in the resonance frequency band of the first/second coupling control resonator 102_1, 102_2. Thus, the control unit 701 can set the amplitude in such a way that the first/second qubit 101_1 can be brought into resonance with the other qubit using the coupling control signal.

The frequency difference between the resonance frequency of the first/second qubit and a resonance frequency of the other qubit may be, for example, preconfigured into the control unit 701. The preconfiguring may be performed, for example, during calibration of the system 700.

According to an embodiment, the control unit 701 is further configured to set a temporal duration of a pulse comprising the frequency component in the resonance frequency band of the first coupling control resonator according to a preconfigured coupling parameter. The preconfigured coupling parameter indicates an intended coupling strength between the first qubit and another qubit.

Alternatively or additionally, the control unit 701 may be further configured to set a temporal duration of a pulse comprising the frequency component in the resonance frequency band of the second coupling control resonator according to a preconfigured coupling parameter. Here, the preconfigured coupling parameter indicates an intended coupling strength between the second qubit and another qubit.

The coupling control signal may include the pulse comprising the frequency component in the resonance frequency band of the first/second coupling control resonator. The temporal duration of the pulse including the frequency component in the resonance frequency band of the first/second coupling control resonator may be, for example, in a range between 1-100 ns or in any subrange of this range, such as between 10-100 ns, 10-80 ns, or 5-50 ns.

The strength of the coupling between the first/second qubit 101_1, 101_2 and the other qubit may be proportional to the duration of the pulse. Thus, the control unit 701 may control the strength of coupling between the first/second qubit 101_1, 101_2 and the other qubit by adjusting the duration of the pulse. The relation between the temporal duration of the pulse and the strength of the coupling may depend on the implementation of the coupling control resonator and/or the implementation of the qubits.

The preconfigured coupling parameter may be set by, for example, a user. The intended coupling strength may depend on the type of computing operation to be performed by the qubits. The user may need the first/second qubit and the other qubit to perform, for example, a quantum logic gate operation. Thus, the control unit 701 may set the preconfigured coupling parameter according to the quantum logic gate operation needed by the user.

According to an embodiment, the control unit 701 is further configured to frequency-division multiplex the frequency component in the resonance frequency band of the first coupling control resonator 102_1 and the frequency component in the resonance frequency band of the second coupling control resonator 102_2 into the coupling control signal. The frequency component in the resonance frequency band of the first coupling control resonator 102_1 and the frequency component in the resonance frequency band of the second coupling control resonator 102_2 may, for example, temporally overlap. Since the first coupling control resonator 102_1 and the second coupling control resonator 102_2 may demultiplex the frequency components from the coupling control signal, the control unit 701 may shift the frequency of the first 101_1 and second qubit 101_2 with a reduced delay.

Although the connection 702 between the arrangement 100 and the control unit 701 is schematically illustrated as a single connection in the embodiment of FIG. 8, the control unit 701 may be electrically coupled to a plurality of coupling control signal lines 103 in the arrangement 100. The control unit 701 may also be electrically coupled to the plurality of rotation signal lines 501 and/or to the plurality of readout signal lines 503 in the arrangement 100 discussed in connection with FIG. 6. Thus, the control unit 701 may be configured to control qubit frequency shifting, rotation, and/or readout in the arrangement 100.

Any parameter related to the arrangement 100, such as the resonance frequency of any qubit in the plurality of qubits, the resonance frequency band of any coupling control resonator in the plurality of coupling control resonators, an amplitude of any frequency component in the coupling control signal, and/or a temporal duration of any pulse in the coupling control signal may be preconfigured into the control unit 701. The preconfiguring may be performed during, for example, calibration of the system 700.

Figure 9:
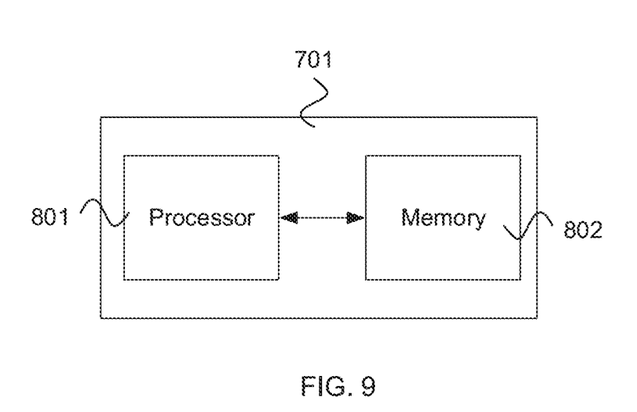
FIG. 9 illustrates a schematic representation of a control unit according to an embodiment.

FIG. 9 illustrates a schematic representation of a control unit 701 according to an embodiment. The control unit 701 may include at least one processor 801. The at least one processor 801 may comprise, for example, one or more of various processing devices, such as a co-processor, a microprocessor, a control unit 701, a digital signal processor (DSP), processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The control unit 701 may further include a memory 802. The memory 802 may be configured to store, for example, computer programs and the like. The memory 802 may comprise one or more volatile memory devices, one or more non-volatile memory devices, and/or a combination of one or more volatile memory devices and nonvolatile memory devices. For example, the memory 802 may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

The memory 802 may comprise, for example, the preconfigured coupling parameter, the frequency difference between the resonance frequency of the first/second qubit and a resonance frequency of another qubit, and/or any other parameter related to the arrangement 100.

The control unit 701 may further comprise other components not illustrated in the embodiment of FIG. 9. The control unit 701 may include, for example, an input/output bus for connecting the control unit 701 to the arrangement 100. Further, a user may control the control unit 701 via the input/output bus. The user may, for example, control quantum computation operations performed by the arrangement 100 via the control unit 701 and the input/output bus.

When the control unit 701 is configured to implement some functionality, some component and/or components of the control unit 701, such as the at least one processor 801 and/or the memory 802, may be configured to implement this functionality. Furthermore, when the at least one processor 801 is configured to implement some functionality, this functionality may be implemented using program code comprised, for example, in the memory 802. The control unit 701 may be implemented using, for example, a computer, some other computing device, or similar.

Figure 10:
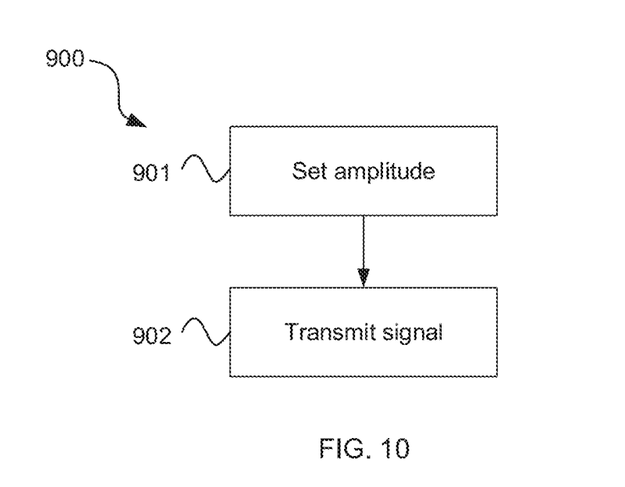
FIG. 10 illustrates a flow chart representation of a method according to an embodiment.

FIG. 10 illustrates a flow chart representation of a method 900 according to an embodiment. According to an embodiment, the method 900 includes setting an amplitude of a frequency component in a resonance frequency band of a first coupling control resonator according to a frequency difference between a resonance frequency of a first qubit and a resonance frequency of another qubit in a plurality of qubits (block 901).

The method 900 may further comprise transmitting the coupling control signal to the coupling control signal line (block 902). The method 900 may be performed by, for example, the control unit 701.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A quantum computing system for selectively shifting qubit resonance frequencies, the system comprising: a plurality of qubits including at least a first qubit and a second qubit, each of the first qubit and the second qubit having a respective resonance frequency; a plurality of coupling control resonators including at least a first coupling control resonator and a second coupling control resonator each having a respective resonance frequency band; and a coupling control signal line for feeding a coupling control signal to at least the first coupling control resonator and the second coupling control resonator, wherein the first coupling control resonator is configured to shift the resonance frequency of the first qubit when the coupling control signal includes a frequency component in the resonance frequency band of the first coupling control resonator, and wherein the second coupling control resonator is configured to shift the resonance frequency of the second qubit when the coupling control signal includes a frequency component in the resonance frequency band of the second coupling control resonator.

2. The system according to claim 1, wherein the plurality of qubits further includes a third qubit and a fourth qubit, each of the third and the fourth qubits having a respective resonance frequency, and wherein the first qubit is capacitively coupled to the third qubit and the second qubit is capacitively coupled to the fourth qubit.

3. The system according to claim 1, wherein each qubit in the plurality of qubits includes at least one Josephson junction.

4. The system according to claim 1, wherein each qubit in the plurality of qubits includes a superconducting quantum interference device (SQUID).

5. The system according to claim 1, wherein the resonance frequency band of at least one of the first or the second coupling control resonator is located in a frequency range that is less than the resonance frequency of the first qubit and the resonance frequency of the second qubit.

6. The system according to claim 1, wherein the shift of the resonance frequency of the first qubit is proportional to an amplitude of the frequency component in the resonance frequency band of the first coupling control resonator.

7. The system according to claim 1, wherein the shift of the resonance frequency of the second qubit is proportional to an amplitude of the frequency component in the resonance frequency band of the second coupling control resonator.

8. The system according to claim 1, wherein the first qubit and the second qubit are capacitively coupled to each other, and wherein after the first qubit and the second qubit are set in resonance, quantum gate operations are performed on the first qubit and the second qubit.

9. The system according to claim 1, wherein the first coupling control resonator is configured to shift the resonance frequency of the first qubit by tuning a Josephson inductance of the first qubit.

10. The system according to claim 9, wherein the first coupling control resonator is configured to shift the resonance frequency of the first qubit by tuning a Josephson inductance of the first qubit by inducing a magnetic flux through the first qubit or by causing a current flow through the first qubit.

11. The system according to claim 1, further comprising a plurality of coupling control signal lines including the coupling signal line, wherein the plurality of qubits is arranged into a matrix, each qubit in the plurality of qubits having a respective resonance frequency, and each coupling control signal line in the plurality of coupling control signal lines corresponding to a column/row of the matrix, and wherein each coupling control resonator in the plurality of coupling control resonators is configured to shift the resonance frequency of a corresponding qubit in the plurality of qubits when a coupling control signal in a corresponding coupling control signal line comprises a frequency component in the resonance frequency band of that coupling control resonator.

12. The system according to claim 1, further comprising a control unit electrically coupled to the coupling control signal line, wherein the control unit is configured to: set an amplitude of the frequency component in the resonance frequency band of the first coupling control resonator according to a frequency difference between the resonance frequency of the first qubit and a resonance frequency of another qubit in the plurality of qubits, and transmit the coupling control signal to the coupling control signal line.

13. The system according to claim 12, wherein the control unit is further configured to set a temporal duration of a pulse including the frequency component in the resonance frequency band of the first coupling control resonator according to a preconfigured coupling parameter.

14. The system according to claim 13, wherein the preconfigured coupling parameter indicates an intended coupling strength between the first qubit and the another qubit.

15. The system according to claim 13, wherein the control unit is further configured to frequency-division multiplex the frequency component in the resonance frequency band of the first coupling control resonator and the frequency component in the resonance frequency band of the second coupling control resonator into the coupling control signal.

16. A method for selectively shifting qubit resonance frequencies using a quantum computing system, wherein the quantum computing system comprises: a plurality of qubits including at least a first qubit and a second qubit, each of the first qubit and the second qubit having a respective resonance frequency; a plurality of coupling control resonators including at least a first coupling control resonator and a second coupling control resonator each having a respective resonance frequency band; and a coupling control signal line for feeding a coupling control signal to at least the first coupling control resonator and the second coupling control resonator, wherein the first coupling control resonator is configured to shift the resonance frequency of the first qubit when the coupling control signal includes a frequency component in the resonance frequency band of the first coupling control resonator, wherein the second coupling control resonator is configured to shift the resonance frequency of the second qubit when the coupling control signal includes a frequency component in the resonance frequency band of the second coupling control resonator; and wherein the method comprises: setting an amplitude of the frequency component in the resonance frequency band of the first coupling control resonator according to a frequency difference between the resonance frequency of the first qubit and a resonance frequency of another qubit in the plurality of qubits; and transmitting the coupling control signal to the coupling control signal line.

17. A non-transitory computer program product comprising program code that performs the method of claim 16, wherein the program code is executed on a computer.

* * * * *